Patented Nov. 1, 1927.

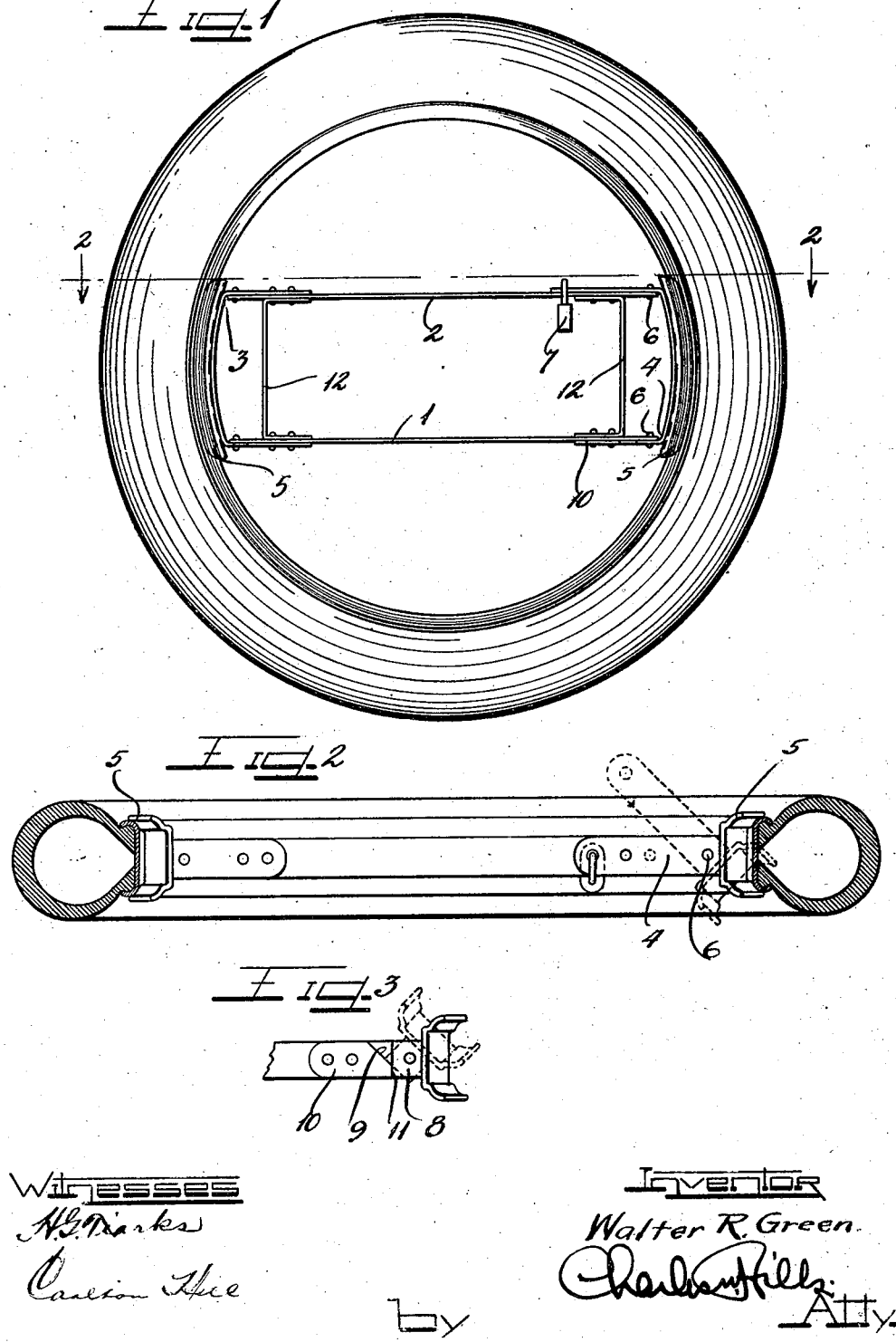

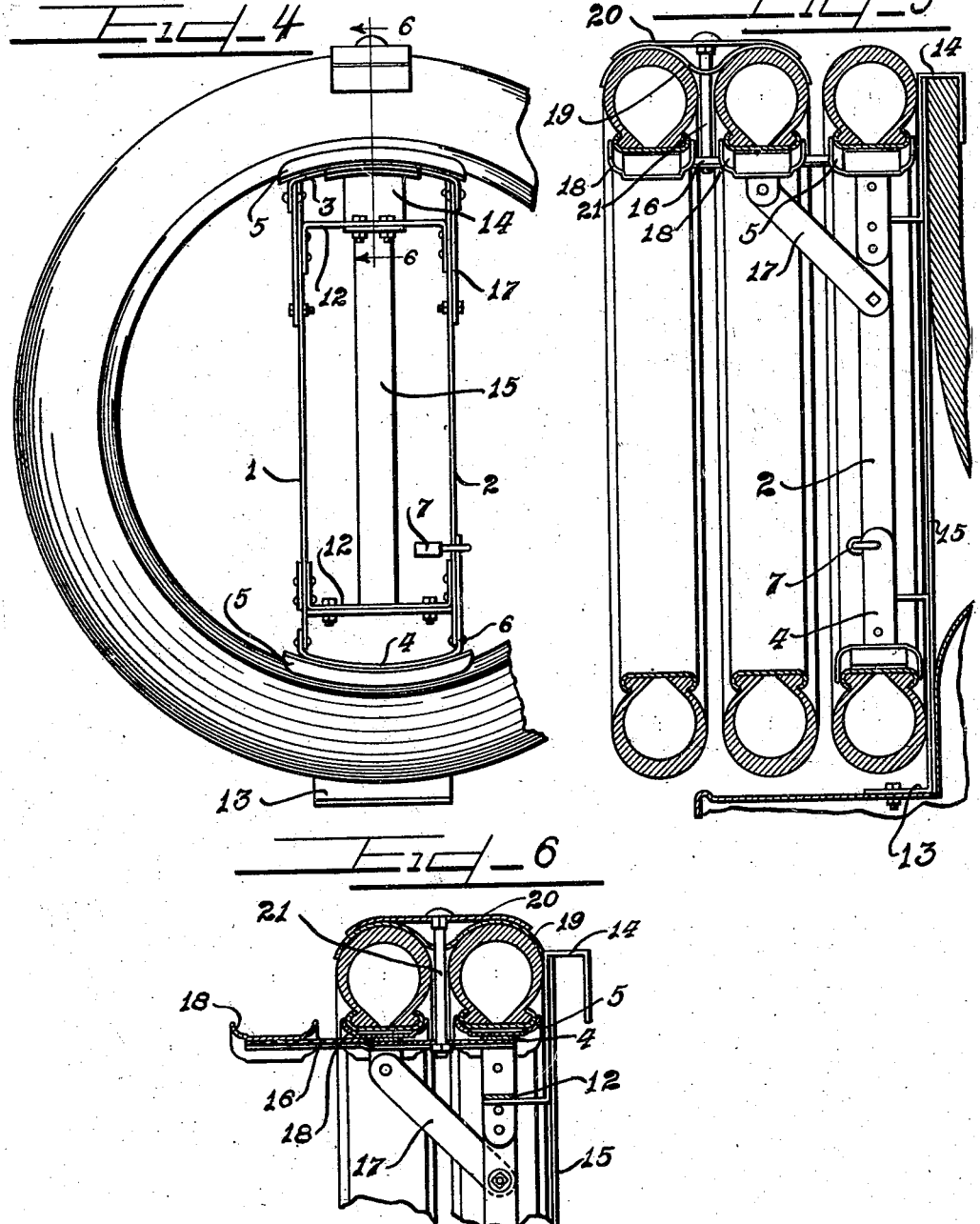

1,647,442

UNITED STATES PATENT OFFICE.

WALTER R. GREEN, OF CHICAGO, ILLINOIS; ALBERT H. GREEN, EXECUTOR OF SAID WALTER R. GREEN, DECEASED, ASSIGNOR TO INTERNATIONAL STAMPING COMPANY, OF CHICAGO, ILLINOIS, A CORPORATION OF ILLINOIS.

TIRE CARRIER.

Application filed June 21, 1923. Serial No. 646,811.

This invention relates to a tire carrier of that type which circumferentially supports the rim of a tire.

It is an object of this invention to provide a cheap and simple tire carrier upon which the tire can be quickly mounted or removed by a snapping action.

The invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:

Figure 1 is an elevational view of the tire carrier with a tire supported thereon.

Figure 2 is an enlarged sectional view upon the line 2—2 of Figure 1.

Figure 3 is a fragmentary detail view of the snap shoe.

Fig. 4 is a fragmentary elevational view of a supplemental tire carrier supported by the main carrier.

Fig. 5 is a side elevation of the carrier with the tires in section.

Fig. 6 is a fragmentary sectional view upon the line 6—6 of Fig. 4 showing the arrangement for carrying one additional tire.

As shown on the drawings:

In referring now to the drawings, there is illustrated an oblong frame having a tire rim supporting shoe at each end, one of said shoes being pivotally mounted and self-latching and self-unlatching for respectively locking a tire thereon or releasing the same therefrom.

In the present instance, the frame consists of metal side members 1 and 2 appropriately spaced apart in a parallel relation and end members 3 and 4 in the form of U-shaped brackets having outwardly opening rim supporting shoes 5 thereon, the end member 3 being preferably rigidly secured by bolts or the like to the side members, while the member 4 is pivotally secured to the side members by the pivots 6 adjacent the shoe so that the same can swing in the arc of a circle upon a short radius. One arm of the member 4 extends inwardly a considerable distance in overlapping relation with the side member 2 which is provided with an aperture that normally registers with an aperture in said arm for receiving the hasp of a padlock 7 for locking the member 4 in operative position. The other arm of said member 4 is provided with a stop piece 8 that abuts a stop member 10 on the side 1; said stop member having an inclined shoulder 9 and a stop shoulder 11 at right angles to the longitudinal axis of the side member 1. The stop 8 on the swingable shoe 4 is adapted to engage the inclined stop 9 when the said shoe is in inoperative or eccentric position and is adapted to engage the stop 11 when in normal or operative position for readily assembly of a tire.

The carrier may be supported on the chassis by means of the brackets 12 which are bolted between the side members 1 and 2 and aid in giving rigidity to the frame. The frame may be supported either in horizontal position, as shown, or in vertical position if desirable. Assuming that the parts are in the positions shown in full lines in the drawing with a tire supported upon the carrier, to remove this tire, the padlock 7 is unlocked and removed to release the shoe 4, then by grasping the tire at a point adjacent the shoe 4 and pulling it in a downward direction, as viewed in Figure 2, the member 4 will automatically swing upon its pivots until the stop 8 engages the inclined stop shoulder 9, as shown in dotted lines in Figs. 2 and 3, which is a sufficient swing to allow the tire to snap from the carrier. In replacing a tire the same is placed upon the carrier when the member 4 is in dotted line position; then by pushing the tire upwardly, as viewed in Fig. 2, at a point adjacent the member 4, the latter will swing upon its pivot and snap into position with the shoulder 8 resting against the shoulder 11; during this movement, the tire will also snap into proper position on the carrier. As the swingable tire rim shoe is thuswise actuated in removing or replacing a tire, the same might be termed self-latching and self-unlatching.

It will be appreciated that this structure greatly facilitates the mounting or removal of a tire from the carrier. Nothing but a quick snapping action is necessary for mounting or removing a tire from the carrier.

In the use of the word "tire" it should be understood that the same contemplates the inclusion of a tire mounted upon a supporting rim.

In referring to Figs. 4, 5, and 6, which illustrate a supplemental tire carrier which is supported by the main carrier, it will be noted that the main carrier is provided with a lower foot 13 resting upon the running board, and an upper hook-like suspension 14 that hooks upon the blind door of a car such as a Ford car. The parts 13 and 14 consist of angle irons properly fashioned and bolted to the brackets 12, and a strip 15 may extend between the two to reinforce the carrier and provide a proper backing therefor.

The supplemental carrier consists of a plate member 16 which is welded or secured in any well known way to the stationary U-shaped bracket 3 and extends outwardly therefrom to form a support for one or more tires. In the present instance it is designed to support a pair of tires. The plate 16 is arcuate in transverse directions so as to fit the inner circumference of the tire, and it is sustained in position by a diagonal U-shaped brace 17 which has its legs pivoted to the sides 1 and 2 and its web secured to the bottom of the plate 16. A plurality of tire supporting shoes 18 are welded or secured upon the plate 16.

A plate 19 having a pair of spaced concave depressions and a top plate 20 are adapted to be superposed over the extra tires on the supplementary carrier, and bolted to the plate 16 by one or more bolts 21, extending between the tires. If only one extra tire is carried, the plates 19 and 20 are clamped over the same and over the tire on the main carrier as shown in Fig. 6. If two extra tires are carried the plates 19 and 20 are clamped over the same and to the plate 16 as shown in Fig. 5.

It will readily be apparent that the supplemental carrier may be readily attached to the main carrier. It may be made detachable with respect thereto if desired.

I am aware that numerous details of construction may be varied through a wide range without departing from the principles of this invention, and I therefore do not purpose limiting the patent granted otherwise than necessitated by the prior art.

I claim as my invention:

1. In a tire carrier, a frame comprising a pair of parallel members, an attaching bracket connected to said members, an arcuate tire supporting shoe having a pair of spaced inwardly directed arms attached to said parallel members adjacent one end thereof, a second arcuate tire supporting shoe having a pair of inwardly directed arms pivoted to said parallel members adjacent the other end thereof, one of said last mentioned arms extending beyond its pivot point, and provided with an aperture registering with an aperture in said frame and a stop member secured upon said frame adjacent the other of said last mentioned arms for limiting the pivotal movement thereof in two directions.

2. In a tire carrier, a frame comprising a pair of spaced parallel members, a tire supporting shoe having means attached to one end of each member, a second tire supporting shoe having spaced parallel arms pivoted to the other ends of said members, a stop member adjacent one arm and having a stop shoulder for arresting said pivoted shoe in operative or normal position and an inclined stop shoulder for arresting said shoe in its inoperative or eccentric position.

3. In a tire carrier, a frame, a tire supporting shoe at one end of said frame, a second tire supporting shoe pivoted to the other end of said frame, said pivoted shoe comprising a pair of arms, means for locking one arm to said frame and a two shouldered stop member cooperating with the other arm for the purpose set forth.

4. In a tire carrier, a pair of tire supporting shoes arranged upon diametrically opposite points in the arc of a circle defined by the tire, a support extending between said shoes, one shoe being pivotally attached to said support and actuatable transversely to the plane of the tire for snapping a tire on or off said carrier, a stop member on said support having a stop shoulder for arresting said pivoted shoe in normal position and an inclined stop shoulder for arresting the same in eccentric position, and means for locking said pivoted shoe to said frame.

In testimony whereof I have hereunto subscribed my name.

WALTER R. GREEN.